May 27, 1941.
P. H. KRAETCH
2,243,636
MILK BOTTLE SPOUT
Filed Nov. 22, 1938
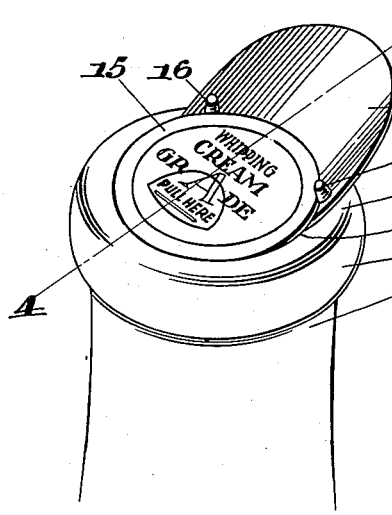
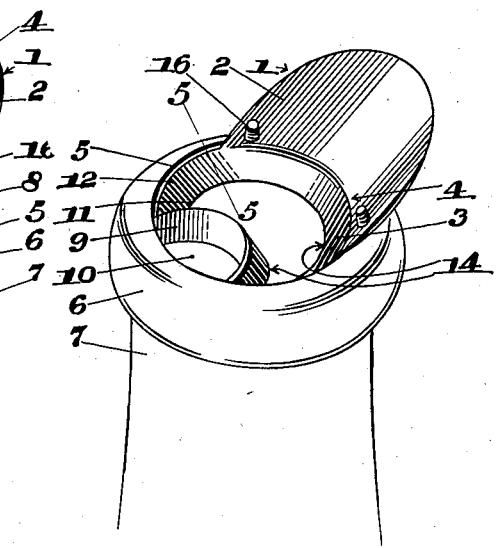
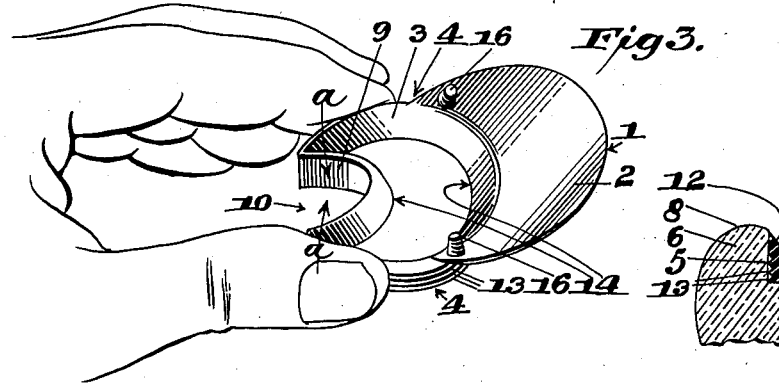
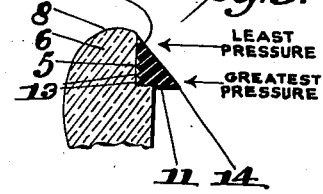
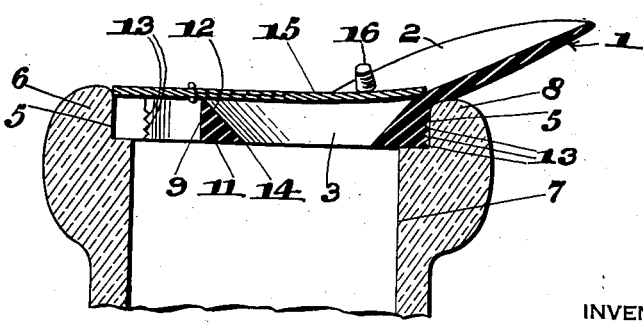
INVENTOR
Paul H. Kraetch
BY
Munn, Anderson & Liddy
ATTORNEY Patented May 27, 1941

2,243,636

UNITED STATES PATENT OFFICE 2,243,636

MILK BOTTLE SPOUT

Paul H. Kraetch, Astoria, Oreg.

Application November 22, 1938, Serial No. 241,848

9 Claims. (Cl. 65—31)

This invention relates to improvements in pouring devices, more specifically comprising a spout for milk bottles. Milk and cream are commonly delivered to the homes of consumers in bottles of more or less familiar types. In the majority of instances these bottles have a card-board disk comprising a closure cap. This cap is forced into the mouth of the bottle and rests upon a cap seat.

In some instances the mouth and neck of the bottle are covered with a transparent wrapper, but in the majority of cases the card-board disk is the only closure that is provided. This leaves the rim of the bottle exposed and thus subject to contamination because of being touched by a number of hands before the bottle reaches its destination. Obviously, the handling is solely on the outside of the neck and rim, the cap seat therefore being left comparatively clean. With this premise in mind the objects of the invention are as follows:

First, to provide a spout which is insertible into the mouth of a milk bottle in such a way as to rest on the customary cap seat, thereby facilitating the pouring of the liquid and, what is more important, to insure pouring from the inside of the bottle across the pouring lip, the inserted portion of the spout constituting a bridge over the contaminated rim of the bottle mouth.

Second, to provide a spout which is easily attached and detached from the mouth of a milk or cream bottle, for the purposes of preventing the liquid from coming in contact with the rim of the bottle, as well as to facilitate the pouring, further to provide means enabling the replacement of the card-board cap so as to temporarily close the bottle when not in use and without removing the pouring spout.

Third, to provide a pouring spout consisting of a soft rubber unit, the ring portion of the spout being expansible or contractible as may be necessary to accommodate the spout to various sizes of cap seats or to automatically adapt itself to a normally sized cap seat in the event of the ring portion having become swollen, this facility insuring the retention of the pouring spout in the mouth of the bottle during the pouring of the liquid.

Fourth, to provide a milk bottle spout with a ring portion as described above, provided with a resilient arc of reversed curvature, which allows easy contraction of the ring portion by finger pressure and insures the expansion of the ring portion to any size of cap seat within ordinary limits.

Other objects and advantages will appear in the following specification, reference being had to the accompanying drawing, in which:

Figure 1 is a perspective view of the neck and rim of a milk or cream bottle, showing how a closure cap can be seated with the improved pouring spout in place.

Figure 2 is a perspective view of the same bottle neck and rim, showing the details of the pouring spout.

Figure 3 is a perspective view illustrating how the resilient arc of reversed curvature permits a ready contraction of the ring portion by finger pressure.

Figure 4 is a cross section taken on the line 4—4 of Fig. 1.

Fig. 5 is a cross section taken on the line 5—5 of Fig. 2.

In carrying out the invention the milk bottle spout, generally designated 1 comprises a pouring lip 2 which extends off at an appropriate pitch from the ring portion 3 of the foundation 4 of the spout. The portion 3 is intended to fit the cap seat 5 in the mouth 6 in the neck 7 of a milk or other bottle, adjacent to the rim 8.

This rim, as brought out above, is very likely to become dirty through repeated handling. When the foundation 4 is inserted in the seat 5 it bridges over the contaminated part of the mouth 6, making sure that the user will be able to pour the milk as clean as it is delivered in the bottle. The portion 3 comprises part of a ring because of its having to occupy the circular seat 5. But because of the fact that cap seats are apt to vary, and more especially because of the fact that the foundation 4 is apt to swell with use, provision has been made to adapt the spout to milk bottles under any of the foregoing circumstances.

The means which makes this adaptation possible is the arc or offset 9 of reverse curvature. This designation means that the arc is curved contrary to that section which would comprise the completion of the ring portion 3 at the point 10 (Fig. 3). This point becomes an open space or gap which is made to serve a very important purpose.

This purpose is well illustrated in Fig. 3. A person taking the foundation 4 between the thumb and forefinger presses the extremities of the ring portion 3 together (arrows a). The arc 9 will yield, and inasmuch as the arc is directed inwardly of the ring portion the terminals of the latter will close in somewhat upon the space or gap 10. This, in effect, reduces the size of the ring portion 3, enabling the latter to be easily fitted into the cap seat 5 of a milk bottle.

It is to be observed in each of Figs. 4 and 5 that the cross sectional shape of the arc 9 and ring portion 3 is that of a right triangle. The base 11, so commonly designated in each of Figs. 4 and 5, constitutes the fixed horizontal portion of the structure. The base, being heaviest, will exercise the greatest pressure on the side wall of the cap seat. The apex 12 of the ring portion 3 (Fig. 5) exerts the least pressure.

This structural provision makes it possible for the spout to remain seated during pouring, and also makes it possible to adequately seat the spout even if the upright wall of the cap seat either is or becomes wet. The holding function of the base of the ring portion 3 is augmented by a plurality of ribs 13 or some equivalent roughening. The annular ribs are ordinarily preferred, but the roughening might comprise a criss-cross work which would also have a good effect in aiding the adhesion of the spout to the bottle.

The reason for shaping the arc 9 identically with the ring portion 3 as far as the cross sectional contour is concerned is to insure the expansion of the arc following its partial closure at 10 by finger pressure. Because of the fact that the ring portion and arc are made triangular as illustrated, it follows that the edge commonly designated 14, will project into the neck passage 7. This, however, is not objectionable. In most cases the vertical thickness of the foundation 4 is nearly equal to the depth of the cap seat 5. But there is usually room enough to enable the replacement of the customary card-board cap 15 (Figs. 1 and 4). The forward edge of this cap is abutted against a pair of lugs 16 at the base of the pouring lip 2. Enough of the rim of the cap can be pressed into the seat 5 to make a fairly good connection and this, coupled with the abutment of other portions of the cap against the lugs 16, reestablishes a closure of the bottle that is quite satisfactory for ordinary purposes.

Usually the spout is made of white rubber. This, however, is not intended as a limitation. It may be made of any desired composition which has the quality of resilience, the latter being required to allow for the squeezing together of the ring portion terminals (Fig. 3) to adapt the spout to various sizes of cap seats.

I claim:

1. A spout comprising a pouring lip, a continuous foundation from which the lip extends, and an offset directed inwardly of and incorporated in the foundation without breaking the continuity thereof, being automatically collapsible toward the inside of the foundation by the application of finger pressure to constrict the foundation preparatory to insertion in the mouth of a container.

2. A spout comprising a pouring lip, a ring portion constituting a foundation from which the lip extends, and an offset embodied in the ring portion being collapsible upon squeezing the ring portion together.

3. A spout comprising a pouring lip, a ring portion constituting a foundation from which the lip extends, and an offset in the foundation, joining the ends of the ring portion and comprising an interruption in the contour of the foundation, said offset being collapsible to lessen the diameter of the ring portion when the sides of the latter are pressed together.

4. A spout comprising a pouring lip, a ring portion constituting a foundation from which the lip extends, and an arc embodied in the ring portion being curved inwardly of the ring portion and being collapsible to lessen the diameter of the ring portion when the sides of the latter are pressed together.

5. A spout comprising a pouring lip, and a ring portion from which the lip extends, said ring portion being right triangular in cross section, the base and thickest part of the triangle being farthest from the connection of the lip to the ring portion, and a plurality of ribs on the outside of the ring portion, chiefly in the region of said thickest part.

6. A spout comprising a pouring lip, a ring portion from which the lip extends, said ring portion being adapted to be fitted into a bottle cap seat, and plural lugs on the lip, defining substantial continuations of the boundary of the cap seat wall, thereby to stop and retain a bottle cap emplaced in said seat on top of the ring portion.

7. A spout comprising a pouring lip, a ring portion from which the lip extends, an inwardly arced member embodied in the ring portion, interrupting the continuity of the ring portion and defining a gap in said continuity, said arc being collapsible when the ring portion is squeezed together for insertion in the cap seat of a bottle, and lugs on the lip, contiguous to the ring portion and adapted to act as stops for a card-board cap emplaced in the cap seat on top of the ring portion.

8. A spout comprising a pouring lip, a ring portion from which the lip extends, said ring portion being right triangular in cross section, the base and thickest part of the triangle being at the bottom so as to exert the greatest pressure against the bottom of the wall adjacent to a cap seat when said spout is inserted therein, and an arc embodied in the ring portion, being offset inwardly of the ring portion and being of right triangular cross section to correspond to the ring portion so that the offset part acts as a strut against the contiguous portions of the ring, bracing the latter and aiding its maintenance in seating position.

9. A spout comprising a unitary resilient foundation ring, solid in body to insure adequate firmness in handling prior to emplacement on the cap seat of a bottle, said ring having a simple spoon-shaped pouring lip extending from and monopolizing only a fraction of the perimetric contour of the ring, and said ring being right-triangular in cross section to provide a right angled external corner to fit the cap seat and an internal hypotenuse in mergence with the spoon-concavity of the lip.

PAUL H. KRAETCH.